United States Patent
Ma et al.

(10) Patent No.: US 12,456,492 B2
(45) Date of Patent: Oct. 28, 2025

(54) MULTIMEDIA DATA RECORDING METHOD AND DEVICE

(71) Applicant: Lenovo (Beijing) Limited, Beijing (CN)

(72) Inventors: Gang Ma, Beijing (CN); Bo Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 31 days.

(21) Appl. No.: 18/432,914

(22) Filed: Feb. 5, 2024

(65) Prior Publication Data

US 2024/0312487 A1  Sep. 19, 2024

(30) Foreign Application Priority Data

Feb. 8, 2023 (CN) .......................... 202310115797.9

(51) Int. Cl.
| | |
|---|---|
| *G11B 27/036* | (2006.01) |
| *G06V 20/40* | (2022.01) |
| *G10L 17/02* | (2013.01) |
| *G10L 25/57* | (2013.01) |
| *G10L 25/63* | (2013.01) |

(52) U.S. Cl.
CPC ............ *G11B 27/036* (2013.01); *G06V 20/41* (2022.01); *G10L 17/02* (2013.01); *G10L 25/57* (2013.01); *G10L 25/63* (2013.01)

(58) Field of Classification Search
CPC ....... G11B 27/036; G06V 20/41; G10L 17/02; G10L 25/57; G10L 25/63
See application file for complete search history.

(56) References Cited

U.S. PATENT DOCUMENTS

| | | | |
|---|---|---|---|
| 2004/0078188 A1* | 4/2004 | Gibbon ................ | G06F 16/739 704/1 |
| 2013/0006625 A1* | 1/2013 | Gunatilake ........ | H04N 21/4394 704/235 |
| 2013/0101162 A1* | 4/2013 | Vitsnudel ............... | G06F 3/042 382/103 |
| 2022/0014807 A1* | 1/2022 | Lin ....................... | G06N 3/092 |

\* cited by examiner

*Primary Examiner* — Mishawn N. Hunter
(74) *Attorney, Agent, or Firm* — ANOVA LAW GROUP, PLLC

(57) ABSTRACT

A multimedia data recording method includes performing real-time analysis on multimedia data that includes simultaneously collected first audio data and image frame data to obtain voice content and a demonstration action of a target object, determining semantic correlation between the demonstration action and the voice content, performing video understanding on an image frame recording the demonstration action to convert the demonstration action to second audio data in response to the semantic correlation indicating that a content indicated by the demonstration action is inconsistent with the voice content, and dynamically inserting the second audio data into the first audio data to update the multimedia data.

18 Claims, 5 Drawing Sheets

MULTIMEDIA DATA RECORDING METHOD AND DEVICE

CROSS-REFERENCE TO RELATED APPLICATION

This application claims priority to Chinese Patent Application No. 202310115797.9, filed on Feb. 8, 2023, the entire content of which is incorporated herein by reference.

TECHNICAL FIELD

The present disclosure generally relates to the field of image processing technologies and, more particularly, to a multimedia data recording method and device.

BACKGROUND

During podcast recording or live broadcast, a presenter may make some temporary demonstration actions, such as drawing a figure, demonstrating some scenes, or show some objects or charts. This visual information cannot be conveyed to the audience through audio.

This may require a host to be alert at all the time, interrupt the presenter's presentation, and explain to the audience. This requires the host's ability. When both are very engaged, the information is likely to be ignored. Another option is to supplement this information in the audio through post-production, but this is time-consuming and labor-intensive, and cannot solve similar problems in live broadcast scenarios.

SUMMARY

In accordance with the present disclosure, there is provided a multimedia data recording method including performing real-time analysis on multimedia data that includes simultaneously collected first audio data and image frame data to obtain voice content and a demonstration action of a target object, determining semantic correlation between the demonstration action and the voice content, performing video understanding on an image frame recording the demonstration action to convert the demonstration action to second audio data in response to the semantic correlation indicating that a content indicated by the demonstration action is inconsistent with the voice content, and dynamically inserting the second audio data into the first audio data to update the multimedia data.

Also in accordance with the present disclosure, there is provided a computer device including at least one memory storing instructions, and at least one processor configured to execute the instructions to perform real-time analysis on multimedia data that includes simultaneously collected first audio data and image frame data to obtain voice content and a demonstration action of a target object, determine semantic correlation between the demonstration action and the voice content, perform video understanding on an image frame recording the demonstration action to convert the demonstration action to second audio data in response to the semantic correlation indicating that a content indicated by the demonstration action is inconsistent with the voice content, and dynamically insert the second audio data into the first audio data to update the multimedia data.

DETAILED DESCRIPTION OF THE EMBODIMENTS

Figure 1:
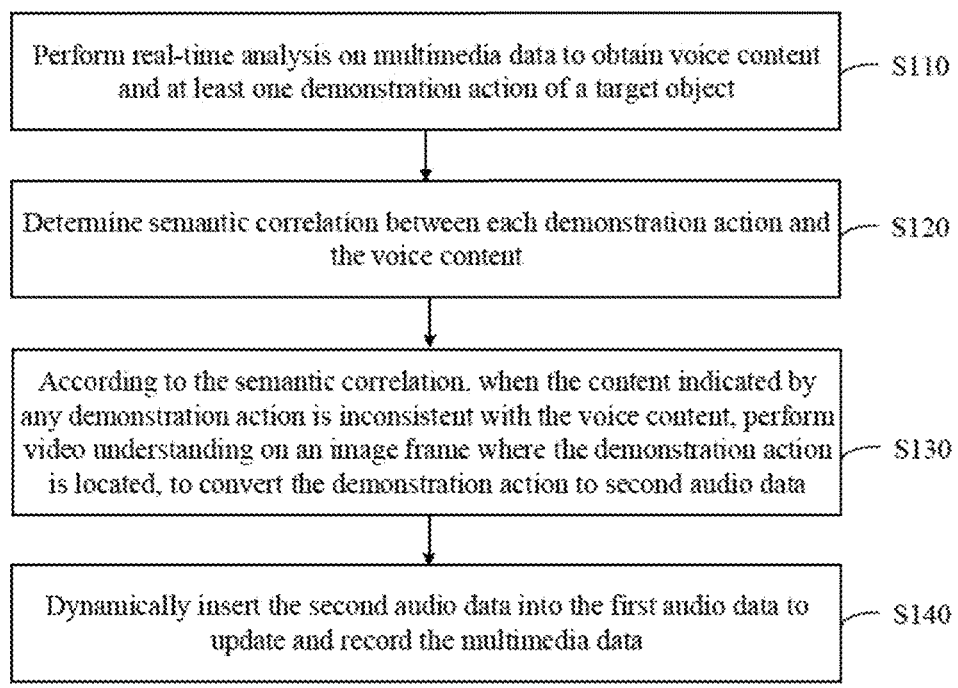
FIG. 1 is a flow chart of a multimedia data recording method consistent with the present disclosure.

Specific embodiments of the present disclosure are hereinafter described with reference to the accompanying drawings. The described embodiments are merely examples of the present disclosure and should not be regarded as limitations of this application. All other embodiments obtained by those of ordinary skill in the art without creative efforts fall within the scope of protection of the present disclosure.

In the present disclosure, reference is made to "some embodiments" which describe a subset of all possible embodiments, but it is understood that "some embodiments" may be the same subset or a different subset of all possible embodiments, and can be combined with each other without conflict.

The terms "first/second/third" involved are only used to distinguish similar objects and do not represent a specific ordering of objects. It is understood that "first/second/third" can be used interchangeably if permitted. The specific order or sequence may be changed such that the embodiments of the present disclosure described herein can be implemented in an order other than that illustrated or described herein.

Unless otherwise defined, all technical and scientific terms used herein have the same meaning as commonly understood by those of ordinary skill in the art in the technical field to which the present disclosure belongs. The terminology used herein is for the purpose of describing the present disclosure only and does not intended to limit the scope of the present disclosure.

The nouns and terms involved in the embodiments of the present disclosure will be first described. The nouns and terms involved in the embodiments of the present disclosure are applicable to the following explanations.

Artificial Intelligence (AI) is an interdisciplinary and emerging discipline based on the computer science and composed of computers, psychology, philosophy and other disciplines. It is a new technical discipline studying and developing theory, method, technology, and application of human intelligence.

AI Generated Content (AIGC) refers to content generated using artificial intelligence technology, and has been widely used in various scenarios. For example, a scene of generating video based on text can convert text into video and enrich the user's perception dimension.

Video understanding is an important task in computer vision. In recent years, video understanding has achieved rapid development with the application of deep learning, especially supervised learning. Tasks such as video behavior classification and video clip summary have achieved impressive results. Video understanding includes video classification, action recognition, temporal behavior detection and video summary generation.

Automatic voice recognition (ASR) refers to a technology that converts human voice into text.

Video Captioning (VC) uses machine learning technology to generate corresponding natural language sentences from videos. It is widely used in human-computer interaction scenarios, such as helping visually impaired people describe video content, video titles or summaries generation, etc.

The process of data acquisition or recording is carried out in the form of digital conversion. During collection, the material content is first converted into digital signals and then stored on a computer's hard drive. Recording is to output data in digital form on the computer hard disk to the recording device connected to it for recording.

The present disclosure provides a multimedia data recording method. The method may be executed by a processor of a computer device. The computer device may be a device with a multimedia data recording function, including a server, a laptop, a tablet, a tabletop computer, a smart television, a TV box, or a mobile device (such as a mobile phone, a portable video player, a personal digital assistant, a dedicated messaging device, or a portable gaming device).

In one embodiment shown in FIG. 1, which is a flowchart of the multimedia data recording method provided by the present embodiment, the method includes S110 to S140.

At S110, real-time analysis is performed on multimedia data to obtain voice content and at least one demonstration action of a target object.

The multimedia data may include first audio data and image frame data collected simultaneously. The first audio data may include audio of all objects, background music, etc., generated in the current scene, which may be collected through an audio collection device. The image frame data may be some images collected on the target object through an image collection device. The audio collection device and the image collection device may or may not be on a same device, while the time stamps of the first audio data and the image frame data may remain consistent.

In some embodiments, the target object may be photographed by the image collection device to obtain the image frame data. In some other embodiments, the image frame data containing the target object may also be obtained by intercepting the obtained video stream. The present disclosure has no limit on this.

In some embodiments, general voice recognition technology may be used to perform voice recognition on the first audio data in the multimedia data to obtain the voice content of the target object, and video understanding technology may be used to perform behavior recognition on the image frame data in the multimedia data to obtain the at least one demonstration action of the target object.

The at least one demonstration action may include but is not limited to facial expressions, mouth movements, body movements, or gesture actions combined with objects, such as gestures to draw a figure, or demonstration of some scenes, or using some objects or charts for presentation, etc. The present disclosure has no limit on this.

At S120, semantic correlation of each of the at least one demonstration action and the voice content is determined.

In one embodiment, each demonstration action may be recognized and converted into corresponding text content, and the voice content may be converted into the corresponding text content. And then, the similarity between the text content of each demonstration action and the text content converted from the voice content may be compared in sequence. The semantic correlation between one demonstration action and the extracted corresponding voice content may be determined when the similarity is greater than a certain threshold.

At S130, according to the semantic correlation, when the content indicated by any demonstration action of the at least one demonstration action is inconsistent with the voice content, video understanding is performed on an image frame corresponding to the demonstration action to convert the demonstration action into second audio data.

In one embodiment, the content indicated by any demonstration action of the demonstration actions may be obtained by recognizing the corresponding demonstration action. When the voice content does not include the content indicated by the demonstration action, the content indicated by the demonstration action may not be able to be delivered to the audience in real time through audio.

In one embodiment, one image frame where the demonstration action with inconsistent indication content is located may be selected as a key frame, and then the information of the key frame may be extracted through a trained text recognition model to obtain text description of the corresponding demonstration action in each key frame. Then, each text description may be converted into the second audio data.

At S140, the second audio data is dynamically inserted into the first audio data to update and record the multimedia data.

In one embodiment, appropriate time slots may be selected according to the context, to dynamically insert the second audio data into the first audio data. And then the processed first audio data and the image may be synthesized to obtain updated multimedia data.

In the present disclosure, the multimedia data may be analyzed in real time to obtain the voice content and the at least one demonstration action of the target object. Then the semantic correlation between each demonstration action and the voice content may be determined. Based on the semantic correlation, when the content indicated by any demonstration action is inconsistent with the corresponding voice content, video understanding may be performed on the image frame corresponding to the demonstration action to convert the demonstration action into the second audio data. Subsequently, the second audio data may be dynamically inserted into the first audio data to update the multimedia data and record. Therefore, the multimedia data may be analyzed in real time to filter out the image frame corresponding to the demonstration action missing in the corresponding voice content, and then video understanding of the image frame may be performed to automatically convert the demonstration action into corresponding audio data, such that the audio data may be dynamically inserted into the originally collected audio data to form multimedia data with complete information for recording. Missing important information may be avoided. Further, the content may be automatically supplemented without post-production, which is suitable for real-time recording scenes.

In some embodiments, S110 may include: performing voice recognition on the first audio data in the multimedia data to obtain the voice content of the target object; performing behavior recognition on the image frame data in the multimedia data to obtain the at least one demonstration action of the target object. Therefore, the voice recognition technology may be used to realize voice recognition of the first audio data such that the voice content of the target object is extracted, and the video understanding technology may be used to perform behavior recognition on the image frame data in the multimedia data to obtain the at least one demonstration action of the target object, thereby achieving rapid analysis of the multimedia data.

In some embodiments, S130 may include: when the semantic correlation indicates that any demonstration action of the at least one demonstration action is related to the voice content, determining the content indicated by the corresponding demonstration action; when the voice content does not include the content indicated by the demonstration action, performing text recognition on the image frame corresponding to the demonstration action to obtain the description text of the same demonstration action; and generating the second audio data based on the description text.

After it is determined that there is one demonstration action related to the voice content in the image frame data, the demonstration action whose indication content has no corresponding audio may be further recognized as the description text, and then the description text may be converted into second audio data through audio editing technology, thereby realizing the real-time understanding and audio conversion of image frames where important demonstration actions are located. Therefore, explanations to the audience may be achieved in real time without interrupting the interview when two parties are engaged completely. Also, post-production may be facilitated.

In some embodiments, the multimedia data may be generated in a live broadcast scene or a recorded broadcast scene, and the target object may be a host or a speaker. Through the multimedia data recording method provided by the embodiments of the present disclosure, the content indicated by the temporary demonstration actions of the presenter may be explained to the audience in real time without interrupting the speaker's presentation in the live broadcast scene or the recording scene, which is beneficial to attracting the audience's attention.

In some embodiments, after S130, the method may further include: when the content indicated by any demonstration action of the at least one demonstration action is inconsistent with the voice content, outputting prompt information. The prompt information may be used to remind the scene host to control the recording progress of the multimedia data. The prompt information may be voice prompt information or visual prompt information. For example, a red dot may flash to remind the scene host to pay attention to the target object's demonstration actions, thereby reducing interruptions and ensuring the recording effect of the multimedia data.

Figure 2:
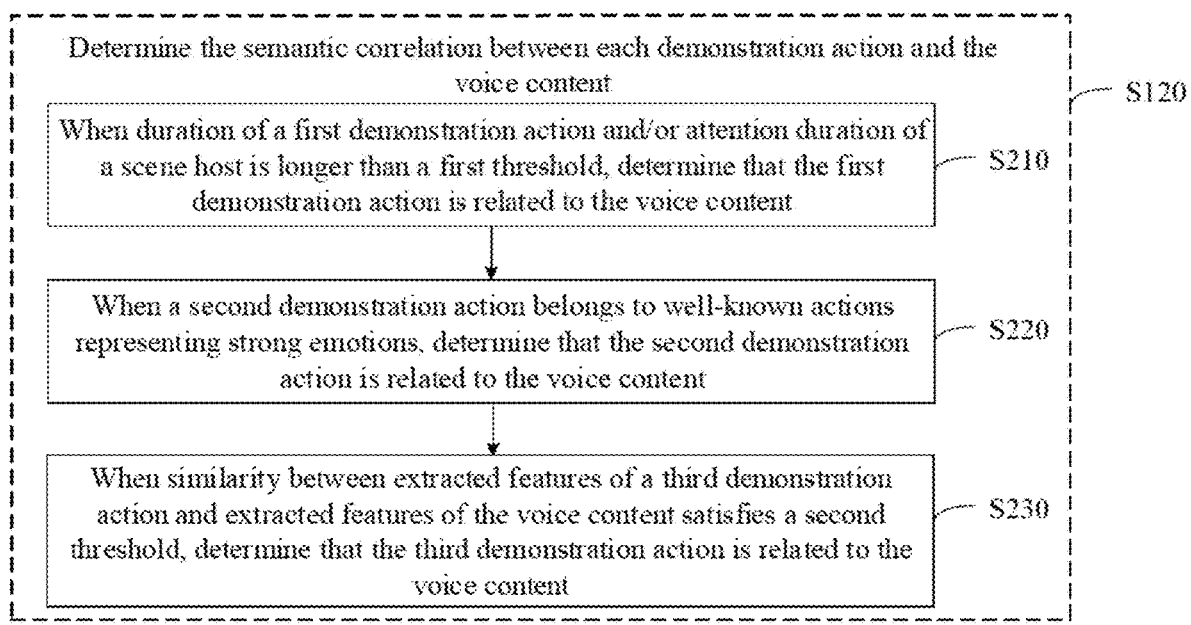
FIG. 2 is a flow chart of another multimedia data recording method consistent with the present disclosure.

In one embodiment shown in FIG. 2, S120 where the semantic relevance between each demonstration action of the at least one demonstration action and the voice content is determined, includes S210 to S230.

At S210, when the duration of a first demonstration action and/or the attention duration of the scene host is longer than a first threshold, it is determined that the first demonstration action is related to the voice content.

The first threshold may be an empirical value and may be set according to actual scenarios. When the duration of the first demonstration action or the attention duration of the scene host on the first demonstration action is relatively longer, it may be indicated that the target object is gesticulating some important content through the first demonstration action. It may be determined that the first demonstration action is related to the voice content extracted in the same scene.

At S220, when a second demonstration action belongs to recognized actions representing strong emotions, it is determined that the second demonstration action is related to the voice content.

The second demonstration action may be the same as or different from the first demonstration action. The recognized actions that represent strong emotions may include actions such as waving hands or clapping to express excitement, or actions such as beating chests and feet or hitting the table to express anger. It is generally believed that when people are emotionally excited, they will be accompanied by some body movements, that is, they will use body language to express emotions. At this time, the audio corresponding to the action may not be collected, and special attention may be required.

At S230, when the similarity between extracted features of a third demonstration action and extracted features of the voice content satisfies a second threshold, it is determined that the third presentation action is related to the voice content.

The third demonstration action may be the same as or different from the first demonstration action or the second demonstration action. The second threshold may be a similarity threshold, such as 0.9, 0.85, etc. The content indicated by the third demonstration action and the voice content may be first converted into corresponding text information respectively, and then the features of the two text information may be extracted to determine the similarity. Then, whether the third demonstration action and the voice content are related may be determined based on the similarity.

In the present disclosure, the semantic correlation between the demonstration action and the voice content may be determined according to at least one of the duration of the demonstration action, the attention duration of the scene host, whether the demonstration action is a recognized action that represents strong emotions, or the similarity between the features of the demonstration action and the features of the voice content extracted in the same scene, for subsequent audio conversion of important demonstration actions. The analysis and conversion of actions randomly triggered by the target object may be reduced, improving the real-time recording effect of the multimedia data.

Figure 3:
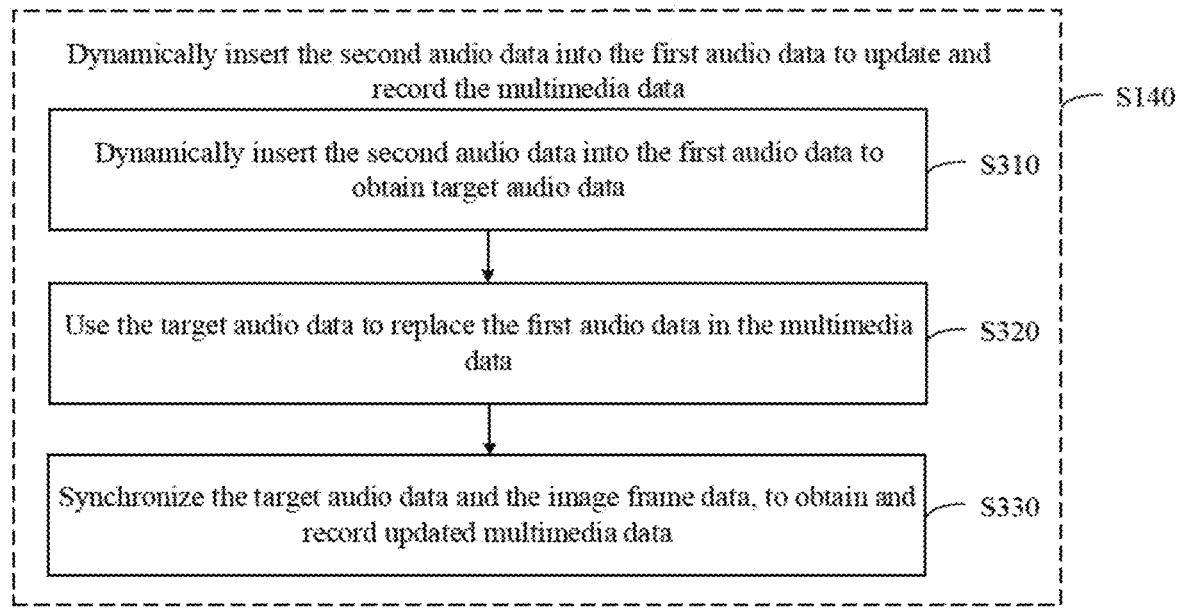
FIG. 3 is a flow chart of another multimedia data recording method consistent with the present disclosure.

In one embodiment shown in FIG. 3, S140 where the second audio data is dynamically inserted into the first audio data to update the multimedia data for recording, includes S310 to S330.

At S310, the second audio data is dynamically inserted into the first audio data to obtain target audio data.

In some embodiments, idle periods in the first audio data may be selected to automatically insert the second audio data, to merge the first audio data and the second audio data into a piece of target audio data. The idle periods may indicate that the speaker, such as the target object or the scene host, pauses and no audio information is collected. Therefore, the second audio data converted from the demonstration action may be inserted into the originally collected first audio data, which facilitates the later recording of multimedia data with complete information.

In some embodiments, an action occurrence interval in the first audio data corresponding to the demonstration action related to the voice content may be determined. At least one idle period closest to the end time of the action occurrence interval may be filtered out from the first audio data. A target period in the at least one idle period whose duration meets the requirements may be selected, and the second audio data may be inserted into the target period to obtain the target audio data.

In these embodiments, the timestamp information of the image frame in which the demonstration action related to the voice content is located may be first determined. The timestamp information may include the timestamp of the image frame in which the corresponding demonstration action first appears and the timestamp of the image frame representing the end of the demonstration action. Since the image frame data and the first audio data are collected at the same time, the action occurrence interval in the first audio data corresponding to the demonstration action related to the voice content may be determined according to the timestamp information. Then, according to the context positions of the action occurrence interval, the target period that is idle and longer than the second audio data may be selected from the first audio data, and the second audio data may be dynamically inserted into the target period, thereby realizing the merge of the first audio data and second audio data.

At S320, the target audio data substitutes the first audio data in the multimedia data.

By replacing the first audio data in the multimedia data generated in the current scene with the processed target audio data, the important visual information brought by the target object's demonstration action may be supplemented, improving the audience's listening experience.

At S330, the target audio data and the image frame data are synchronized to obtain updated multimedia data for recording.

The target audio data and the image frame data may be time-aligned according to the timestamp information and then synthesized to obtain the updated multimedia data for recording.

In one embodiment, the target audio data may be separated first to obtain multiple audio frames, ensuring that the multiple audio frames and the collected image frames have a one-to-one correspondence. Corresponding video frames and audio frames may have the same timestamp, thereby achieving the synchronization of the target audio data and the image frame data.

In the above embodiments, the target period that meets the requirements may be selected according to the context, and the second audio data converted from the relevant demonstration action may be dynamically inserted into the first audio data, thereby realizing the merge of the first audio data and the second audio data. The merged target audio data may achieve the real-time interpretation of the target object's demonstration actions to the audience, thereby enabling real-time recording of the multimedia data with complete information. There may be no need to supplement important visual information in the first audio data through post-production, and the recording process may be simplified.

In some embodiments, the start and end positions of the inserted second audio data may be saved and marked for subsequent editing. An annotation function coming with an audio editing software may be used to mark the start and end positions of the second audio data. For example, the data may be marked to indicate that this data is automatically generated audio by the system, which may facilitate later editing.

The multimedia data recording method will be described below with reference to a specific example. This specific embodiment is used as an example only to better illustrate the present disclosure, and does not limit the scope of the present disclosure.

Figure 4:
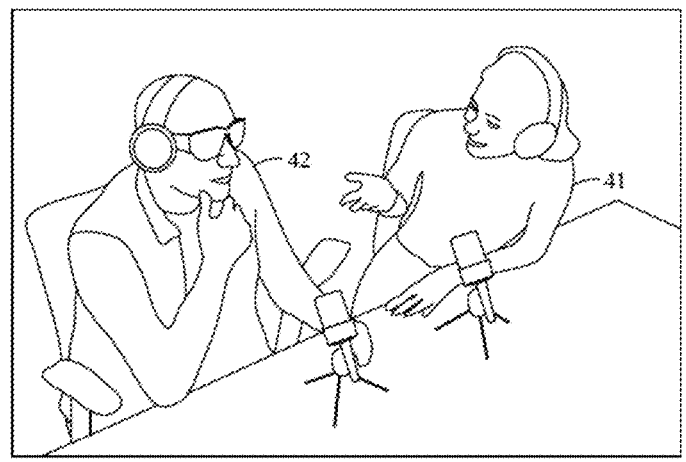
FIG. 4 is a schematic diagram showing a scenario of a multimedia data recording method consistent with the present disclosure.

Nowadays, podcasts are gradually becoming popular and this is an audio media. As shown in FIG. 4, a host 41 conducts interviews with a guest 42 about a topic. The guest 42 is equivalent to the target object described in the embodiments of the present disclosure, which is also called an anchor or a keynote speaker in some scenarios. During podcast recording or live streaming, the presenter may make some temporary demonstration actions, such as drawing a figure, demonstrating some scenes, or showing some objects or charts. Such visual information cannot be conveyed to the audience through audio. This requires the host to be alert at all times, interrupts the speaker's presentation, and explains to the audience. This requires the host's ability, and when both are very engaged, the information is likely to be ignored. Another option is to supplement such information in the audio through post-production, but this is time-consuming and labor-intensive, and cannot solve similar problems in live broadcast scenarios.

In the present disclosure, an all-in-one podcast recording machine with a camera may be provided. While recording the sound, the camera may be used to monitor the speaker. Using AI technology, when it is found that the speaker has important demonstration actions besides sound, such as drawing a figure, demonstrating some scenes, or taking out some objects or charts to make gestures, the AI may automatically convert it into explanation audio (equivalent to the second audio data) after judging the importance. The importance may represent the semantic correlation between the demonstration action and the extracted voice content, which may be measured by the duration of the demonstration action, the host's attention duration, whether there are recognized actions with strong emotions, taking out a certain picture to explain, or the correlation between the explanation and the action itself.

Figure 5:
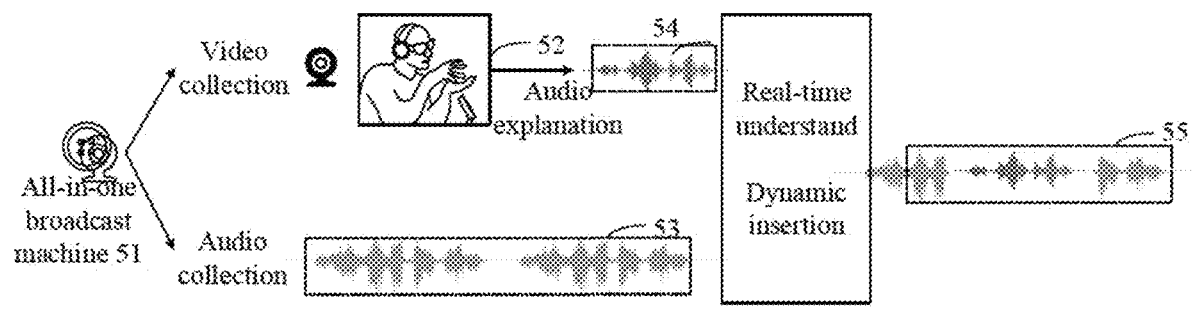
FIG. 5 is a logic flowchart of a multimedia data recording method consistent with the present disclosure.

Then, the appropriate time may be selected according to the context, and the explanation audio may be automatically inserted into the original podcast audio (equivalent to the first audio data). FIG. 5 is a logic flow chart of a multimedia data recording method provided by an embodiment of the present disclosure. As shown in FIG. 5, the all-in-one podcast machine 51 with the camera is used to collect video on the one hand to obtain the image frame data 52 including the target object; and also collect the audio of the current scene on the other hand to obtain the first audio data 53. The image frame data 52 is processed through video understanding to convert the relevant demonstration action contained in the image frame data 52 into the second audio data 54. The appropriate time is selected through real-time understanding, and the second audio data 54 is dynamically inserted into the first audio data 53 to obtain the target audio data 55. In some embodiments, the position where the second audio data 54 is inserted may also be saved and marked to facilitate later editing.

When it is discovered through video understanding that the speaker has made the important presentation action, the host may also be reminded by flashing red dots. Therefore, the explanation to the audience may be achieved in real time without interrupting the interview and when both parties are sufficiently engaged. The post-production may also be facilitated.

The present disclosure also provides a multimedia data recording device. Each module in the device, or each sub-module or unit included in each module may be implemented through a processor in a computer device, or specific logic circuits. The processor may be a central processing unit (CPU), a microprocessor unit (MPU), a digital signal processor (DSP), or a field programmable gate array (FPGA).

Figure 6:
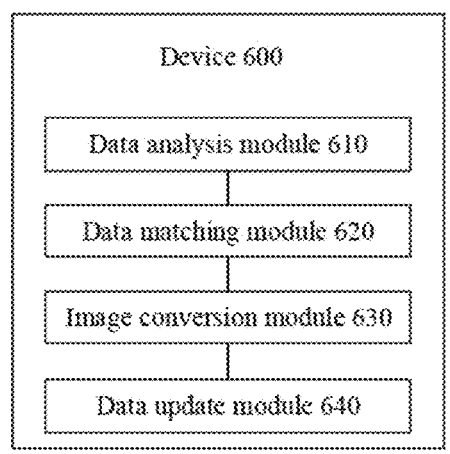
FIG. 6 is a schematic structural diagram of a multimedia data recording device consistent with the present disclosure.

In one embodiment shown in FIG. 6, which is a structural diagram of a multimedia data recording device, the multimedia data recording device 600 includes a data analysis module 610, a data matching module 620, an image conversion module 630, and a data update module 640.

The data analysis module 610 may be used to perform real-time analysis of the multimedia data to obtain the voice content and the at least one demonstration action of the target object. The multimedia data may include the first audio data and the image frame data collected simultaneously.

The data matching module 620 may be used to determine the semantic correlation between each demonstration action and the voice content.

The image conversion module 630 may be used to: when the content indicated by any demonstration action is not consistent with the content indicated by the voice content according to the semantic correlation, perform video understanding on the image frame corresponding to the demonstration action to convert the demonstration action into second audio data.

The data update module 640 may be used to dynamically insert the second audio data into the first audio data to update and record the multimedia data.

In one embodiment, the data matching module 620 may include: a first determination submodule, configured to determine that a first demonstration action is related to the voice content when a duration of the first demonstration action and/or the attention duration of the scene host is longer than a first threshold; or a second determination submodule, configured to determine that a second demonstration action is related to the voice content when the second demonstration action is a recognized action representing strong emotions; or a third determination submodule, configured to determine that a third presentation action is related to the voice content when the similarity between extracted features of the third demonstration action and extracted features of the voice content satisfies a second threshold.

In some embodiments, the data update module 640 may include: an insertion submodule, used to dynamically insert the second audio data into the first audio data to obtain the target audio data; a replacement submodule, used to replace the first audio data in the multimedia data with the target audio data; and a synchronization submodule, used to synchronize the target audio data and the image frame data, to obtain and record the updated multimedia data.

In some embodiments, the insertion sub-module may include: a first determination unit, used to determine the action occurrence interval corresponding to the demonstration action related to the voice content in the first audio data; a filter unit, used to filter at least one idle period closest to the end time of the action occurrence interval from the first audio data; a second determination unit, used to determine the target period in the at least one idle period whose duration meets the requirements; and an inserting unit, used to insert the second audio data in the target period to obtain the target audio data.

In some embodiments, the image conversion module 630 may include: a fourth determination sub-module, configured to, when the semantic correlation indicates that any demonstration action is related to the voice content, determine the content indicated by the demonstration action; a recognition submodule, configured to perform text recognition on the image frame corresponding to the demonstration action when the voice content does not include the content indicated by the demonstration action, and obtain the description text of the demonstration action; and a generating submodule, configured to generate the second audio data based on the description text.

In some embodiments, the data analysis module 610 may include: a voice recognition sub-module, used to perform voice recognition on the first audio data in the multimedia data to obtain the voice content of the target object; a behavior recognition sub-module, configured to perform behavior recognition on the image frame data in the multimedia data to obtain the at least one demonstration action of the target object.

In some embodiments, the device may further include a saving module, configured to save the starting and ending positions of the inserted second audio data and mark them for subsequent editing.

In some embodiments, the multimedia data may be generated in a live broadcast scene or a recorded broadcast scene, and the target object may be a host or speaker.

In some embodiments, the device may further include an information output module, configured to output prompt information when the content indicated by any demonstration action is inconsistent with the voice content. The prompt information may be used to remind the scene host to control the recording progress of the multimedia data.

The description of the above device embodiments is similar to the description of the above method embodiments, and may have similar beneficial effects as the method embodiments. For technical details not disclosed in the device embodiments, the reference may be made to the description of the method embodiments. In some embodiments, the functions or modules provided by the device provided by the embodiments of the present disclosure may be used to perform the methods described in the above method embodiments. For technical details not disclosed in the device embodiments of the present disclosure, reference may be made to the methods embodiments.

When the technical solution of the present disclosure involves personal information, the products including the technical solution of the present disclosure may clearly inform the personal information processing rules and obtain the individuals' independent consent before processing personal information. When the technical solution in the present disclosure involves sensitive personal information, the product including the technical solution in the present disclosure may need to obtain the individual's separate consent before processing sensitive personal information, and meet the requirement of "express consent" at the same time. For example, clear and conspicuous signs may be set on personal information collection devices such as cameras to inform them that they have entered the scope of personal information collection and personal information will be collected. When an individual voluntarily enters the collection scope, he may be deemed to have agreed to the collection of his or her personal information. Or, the personal information processing devices may use obvious logos/information to inform personal information processing rules, to obtain personal authorization through pop-up messages or asking individuals to upload their personal information. The personal information processing rules may include personal information processor, personal information processing purposes, processing methods, types of personal information processed, etc.

In some embodiments, the multimedia data recording method provided by the present disclosure may be implemented in the form of a software function module and may be sold or used as an independent product. Therefore, it may be stored in a computer-readable storage medium. Based on this understanding, the technical solutions of the embodiments of the present disclosure that are essentially or contribute to related technologies may be embodied in the form of a software product. The software product may be stored in a storage medium and may include instructions to enable a computer device (which may be a personal computer, a server, a network device, etc.) to execute all or part of the methods described in various embodiments of the present disclosure. The aforementioned storage media may include: a flash disk, a mobile hard disk, a read only memory (ROM), a magnetic disk, an optical disk, or other media that can store program codes. The embodiments of the present disclosure are not limited to any specific hardware, software, or firmware, or any combination of hardware, software, and firmware.

The present disclosure also provides a computer device. The computer device may include a processor and a memory. The memory may be configured to store computer programs that are able to be executed in the processor. The processor may execute the computer programs to implement all or a part of the multimedia data recording methods provided by the present disclosure.

Correspondingly, one embodiment of the present disclosure provides a computer-readable storage medium configured to store computer programs. When the computer programs are executed by a processor, all or a part of the multimedia data recording methods provided by the present disclosure may be implemented. The computer-readable storage medium may be volatile or non-volatile.

Correspondingly, one embodiment of the present disclosure provides a computer program including computer-readable codes. When the computer program is executed in a computer device, a processor in the computer device may execute any of the methods described in the above embodiments.

One embodiment of the present disclosure also provides a computer program product. The computer program product may include a non-volatile computer-readable storage medium storing a computer program. When the computer program is read and executed by a computer, all or a part of the above methods may be implemented. The computer program product may be implemented specifically through hardware, software or a combination thereof. In some embodiments, the computer program product may be embodied as a computer storage medium. In other embodiments, the computer program product may be embodied as a software product, such as a software development kit (SDK) and so on.

Figure 7:
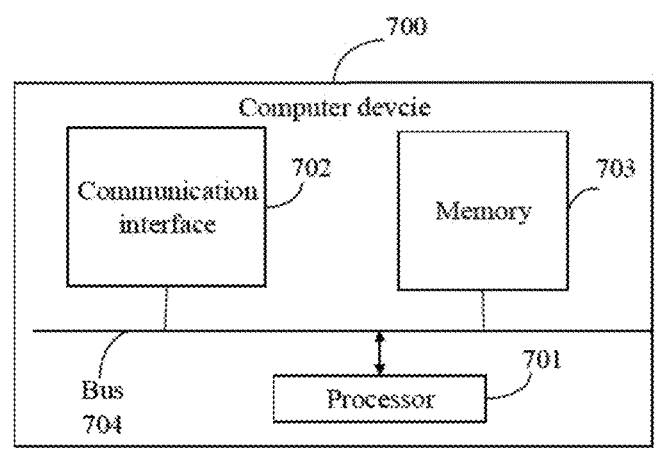
FIG. 7 is a schematic structural diagram showing hardware of a computer device consistent with the present disclosure.

The present disclosure also provides a computer device. FIG. 7 is a structural diagram of a computer device provided by an embodiment of the present disclosure. As shown in FIG. 7, in one embodiment, the computer device 700 includes: a processor 701, a communication interface 702, and a memory 703.

The processor 701 may be configured to generally control the overall operation of computer device 700.

The communication interface 702 may be configured to enable the computer device to communicate with other terminals or servers through a network.

The memory 703 may be configured to store instructions and applications executable by the processor 701, and may also cache data to be processed or processed by the processor 701 and each module in the computer device 700 (for example, image data, audio data, voice communication data, or video communication data). The memory may be implemented through flash memory (FLASH) or random access memory (RAM). Data transmission may be carried out between the processor 701, the communication interface 702 and the memory 703 through a bus 704.

The above-mentioned computer storage media/memory may be read-only memory (ROM), programmable read-only memory (PROM), erasable programmable read-only memory (EPROM), electrically erasable programmable read-only memory (EEPROM), ferromagnetic random access memory (FRAM), flash memory, magnetic surface memory, optical disk, or compact disc read-only memory (CD-ROM). The above-mentioned computer storage media/memory may also be various electronic devices including one or any combination of the above memories, such as mobile phones, computers, tablet devices, or personal digital assistants.

Each embodiment in this specification is described in a progressive mode, and each embodiment focuses on the difference from other embodiments. Same and similar parts of each embodiment may be referred to each other. As for the device disclosed in the embodiments, since it corresponds to the method disclosed in the embodiments, the description is relatively simple, and for relevant details, the reference may be made to the description of the method embodiments.

Units and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

In the present disclosure, the drawings and descriptions of the embodiments are illustrative and not restrictive. The same drawing reference numerals identify the same structures throughout the description of the embodiments. In addition, figures may exaggerate the thickness of some layers, films, screens, areas, etc., for purposes of understanding and ease of description. It will also be understood that when an element such as a layer, film, region or substrate is referred to as being "on" another element, it may be directly on the another element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are only for the convenience of describing the present disclosure, rather than indicating or implying that the device or element referred to must have a specific orientation, be constructed and operated in a specific orientation, and therefore cannot be construed as a limitation of the present disclosure. When a component is said to be "connected" to another component, it may be directly connected to the other component or there may be an intermediate component present at the same time.

It should also be noted that in this article, relational terms such as "first" and "second" are only used to distinguish one entity or operation from another entity or operation, and do not necessarily require or imply that there is such actual relationship or sequence between these entities or operations them. Furthermore, the terms "comprises," "includes," or any other variation thereof are intended to cover a nonexclusive inclusion, such that an article or device including a list of elements includes not only those elements, but also other elements not expressly listed. Or it also includes elements inherent to the article or equipment. Without further limitation, an element associated with the phrase "comprises a . . . " or "includes a . . . " does not exclude the presence of other identical elements in an article or device that includes the above-mentioned element.

The disclosed equipment and methods may be implemented in other ways. The device embodiments described above are only illustrative. For example, the division of the units is only a logical function division. In actual implementation, there may be other division methods, such as: multiple units or components may be combined, or can be integrated into another system, or some features can be ignored, or not implemented. In addition, the coupling, direct coupling, or communication connection between the components shown or discussed may be through some interfaces, and the indirect coupling or communication connection of the devices or units may be electrical, mechanical, or other forms.

The units described above as separate components may or may not be physically separated. The components shown as units may or may not be physical units. They may be located in one place or distributed to multiple network units. Some or all of the units may be selected according to actual needs to achieve the purpose of the solution of the present disclosure.

In addition, all functional units in the embodiments of the present disclosure may be integrated into one processing unit, or each unit may be separately used as a unit, or two or more units can be integrated into one unit. The above-mentioned integration units can be implemented in the form of hardware or in the form of hardware plus software functional units.

All or part of the steps to implement the above method embodiments may be completed by hardware related to program instructions. The aforementioned program may be stored in a computer-readable storage medium. When the program is executed, the steps including the above method embodiments may be executed. The aforementioned storage media may include: removable storage devices, ROMs, magnetic disks, optical disks or other media that can store program codes.

When the integrated units mentioned above in the present disclosure are implemented in the form of software function modules and sold or used as independent products, they may also be stored in a computer-readable storage medium. Based on this understanding, the technical solutions of the embodiments of the present disclosure in essence or those that contribute to the existing technology may be embodied in the form of software products. The computer software products may be stored in a storage medium and include a number of instructions for instructing the product to perform all or part of the methods described in various embodiments of the present disclosure. The aforementioned storage media may include: random access memory (RAM), read-only memory (ROM), electrical-programmable ROM, electrically erasable programmable ROM, register, hard disk, mobile storage device, CD-ROM, magnetic disks, optical disks, or other media that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A multimedia data recording method comprising:
   performing real-time analysis on multimedia data to obtain voice content and a demonstration action of a target object, the multimedia data including first audio data and image frame data that are simultaneously collected;
   determining whether the demonstration action is semantically consistent with the voice content, wherein the demonstration action is semantically consistent with the voice content when a first similarity between text content corresponding to the demonstration action and text content corresponding to the voice content is greater than a threshold;
   in response to the demonstration action being semantically inconsistent with the voice content, performing video understanding on an image frame corresponding to the demonstration action, to convert the demonstration action to second audio data; and
   dynamically inserting the second audio data into the first audio data to update the multimedia data.

2. The method according to claim 1, further comprising determining whether the demonstration action is related to the voice content, wherein the demonstration action is determined as being related to the voice content in response to at least one of:
   a duration of the demonstration action and/or attention duration of a scene host being longer than a first threshold;
   the demonstration action being a well-known action representing a strong emotion; or
   a similarity between an extracted feature of the demonstration action and an extracted feature of the voice content satisfying a second threshold.

3. The method according to claim 1, wherein dynamically inserting the second audio data into the first audio data to update the multimedia data includes:
   dynamically inserting the second audio data into the first audio data to obtain target audio data;
   replacing the first audio data in the multimedia data with the target audio data; and
   synchronizing the target audio data and the image frame data, to obtain updated multimedia data.

4. The method according to claim 3, wherein dynamically inserting the second audio data into the first audio data to obtain the target audio data includes:
   determining an action occurrence interval corresponding to the demonstration action related to the voice content in the first audio data;
   determining at least one idle period closest to an end time of the action occurrence interval from the first audio data;
   determining a target period from the at least one idle period, the target period having a duration period long enough for the second audio data; and
   inserting the second audio data into the target period to obtain the target audio data.

5. The method according to claim 4, further comprising:
   saving start and end positions of the second audio data.

6. The method according to claim 2, wherein, in response to the demonstration action being semantically inconsistent with the voice content, performing video understanding on the image frame corresponding to the demonstration action, to convert the demonstration action to the second audio data, includes:
   in response to the demonstration action being related to the voice content, determining a content indicated by the demonstration action;
   in response to the voice content not including the content indicated by the demonstration action, performing text recognition, through a text recognition mode, on the image frame corresponding to the demonstration action to obtain description text of the demonstration action; and
   generating the second audio data based on the description text.

7. The method according to claim 1, wherein performing real-time analysis on the multimedia data to obtain the voice content and the demonstration action of the target object includes:
   performing voice recognition on the first audio data to obtain the voice content of the target object; and
   performing behavior recognition on the image frame data to obtain the demonstration action of the target object.

8. The method according to claim 1, wherein:
   the multimedia data is generated in a live broadcast scene or a recorded broadcast scene; and
   the target object is a host or a speaker.

9. The method according to claim 1, further comprising:
   in response to demonstration action being semantically inconsistent with the voice content, outputting prompt information, the prompt information reminding a scene host to control a recording progress of the multimedia data.

10. A computer device comprising:
   at least one memory storing instructions; and
   at least one processor configured to execute the instructions to:
      perform real-time analysis on multimedia data to obtain voice content and a demonstration action of a target object, the multimedia data including first audio data and image frame data that are simultaneously collected;
      determine whether the demonstration action is semantically consistent with the voice content, wherein the demonstration action is semantically consistent with the voice content when a first similarity between text content corresponding to the demonstration action and text content corresponding to the voice content is greater than a threshold;
      in response to the demonstration action being semantically inconsistent with the voice content, perform video understanding on an image frame corresponding to the demonstration action, to convert the demonstration action to second audio data; and
      dynamically insert the second audio data into the first audio data to update the multimedia data.

11. The computer device according to claim 10, wherein the at least one processor is further configured to execute the instructions to determine whether the demonstration action is related to the voice content, wherein the demonstration action is determined as being related to the voice content in response to at least one of:
   a duration of the demonstration action and/or attention duration of a scene host being longer than a first threshold;
   the demonstration action being a well-known action representing a strong emotion; or
   a similarity between an extracted feature of the demonstration action and an extracted feature of the voice content satisfying a second threshold.

12. The computer device according to claim 10, wherein the at least one processor is further configured to execute the instructions to:
   dynamically insert the second audio data into the first audio data to obtain target audio data;
   replace the first audio data in the multimedia data with the target audio data; and
   synchronize the target audio data and the image frame data, to obtain updated multimedia data.

13. The computer device according to claim 12, wherein the at least one processor is further configured to execute the instructions to:
   determine an action occurrence interval corresponding to the demonstration action related to the voice content in the first audio data;
   determine at least one idle period closest to an end time of the action occurrence interval from the first audio data;
   determine a target period from the at least one idle period, the target period having a duration period long enough for the second audio data; and
   insert the second audio data into the target period to obtain the target audio data.

14. The computer device according to claim 13, wherein the at least one processor is further configured to execute the instructions to:
   save start and end positions of the second audio data.

15. The computer device according to claim 11, wherein the at least one processor is further configured to execute the instructions to:
   in response to the demonstration action being related to the voice content, determine a content indicated by the demonstration action;
   in response to the voice content not including the content indicated by the demonstration action, perform text recognition, through a text recognition mode, on the image frame corresponding to the demonstration action to obtain description text of the demonstration action; and
   generate the second audio data based on the description text.

16. The computer device according to claim 10, wherein the at least one processor is further configured to execute the instructions to:
   perform voice recognition on the first audio data to obtain the voice content of the target object; and
   perform behavior recognition on the image frame data to obtain the demonstration action of the target object.

17. The computer device according to claim 10, wherein:
   the multimedia data is generated in a live broadcast scene or a recorded broadcast scene; and
   the target object is a host or a speaker.

18. The computer device according to claim 10, wherein the at least one processor is further configured to execute the instructions to:
   in response to the demonstration action being semantically inconsistent with the voice content, output prompt information, the prompt information reminding a scene host to control a recording progress of the multimedia data.

* * * * *